(12) United States Patent
Vohmann et al.

(10) Patent No.: US 6,625,536 B1
(45) Date of Patent: Sep. 23, 2003

(54) METHOD AND DEVICE FOR CONTROLLING AND ADJUSTING A CLUTCH IN AN AUTOMOTIVE AUTOMATIC STEPPED GEARBOX

(75) Inventors: Martin Vohmann, Esslingen (DE); Ralf Dreibholz, Meckenbeuren (DE); Joachim Foth, Wangen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 13 days.

(21) Appl. No.: 10/111,513

(22) PCT Filed: Oct. 24, 2000

(86) PCT No.: PCT/EP00/10456
§ 371 (c)(1),
(2), (4) Date: Jun. 24, 2002

(87) PCT Pub. No.: WO01/33111
PCT Pub. Date: May 10, 2001

(30) Foreign Application Priority Data

Oct. 30, 1999 (DE) .......................................... 199 52 352

(51) Int. Cl.$^7$ .......................... F16H 61/06; F16D 48/06
(52) U.S. Cl. ............................ 701/67; 477/39; 477/166
(58) Field of Search .......................... 701/67, 68, 51, 701/53, 60; 477/37, 39, 50, 70, 166

(56) References Cited

U.S. PATENT DOCUMENTS

| | | | |
|---|---|---|---|
| 4,800,497 A | 1/1989 | Koori et al. ............ | 364/424.1 |
| 4,817,462 A | 4/1989 | Dach et al. ............ | 74/740 |
| 5,206,805 A * | 4/1993 | Petzold et al. ............ | 701/67 |
| 5,491,635 A | 2/1996 | Foeldi et al. ............ | 364/431.1 |
| 5,527,238 A | 6/1996 | Hrovat et al. ............ | 477/166 |
| 5,630,773 A | 5/1997 | Slicker et al. ............ | 477/176 |
| 5,749,061 A * | 5/1998 | Kono et al. ............ | 701/68 |
| 5,802,490 A * | 9/1998 | Droste ............ | 701/51 |
| 6,445,991 B1 * | 9/2002 | Dobele et al. ............ | 701/67 |

FOREIGN PATENT DOCUMENTS

| | | |
|---|---|---|
| DE | 39 37 976 A1 | 5/1990 |
| DE | 39 35 438 A1 | 5/1991 |
| DE | 42 00 541 A1 | 5/1992 |
| DE | 44 09 122 A1 | 2/1995 |
| DE | 198 40 572 A1 | 3/2000 |
| DE | 198 40 573 A1 | 3/2000 |
| EP | 0 189 050 A1 | 7/1986 |
| EP | 0 214 989 B1 | 5/1989 |
| EP | 0 707 998 A2 | 4/1996 |
| WO | WO 99/45290 * | 9/1999 |

* cited by examiner

*Primary Examiner*—Michael J. Zanelli
(74) *Attorney, Agent, or Firm*—Davis & Bujold, PLLC

(57) ABSTRACT

A procedure for the control and regulation of a clutch in an automated stepped transmission for a motor vehicle, in which an electronic control device by means of a first or second regulation circuit determines the behavior of the clutch during three driving conditions and that a traction interrupted shifting from a first into a second gear ratio is carried out. In accord with the invention, for the control and the regulation of the clutch during the first driving condition the first regulation circuit is employed, the size of the regulation thereof being equivalent to the actual value of the motor speed of rotation (n_MOT_IST). During the second driving condition, a second regulating circuit is employed, the size of the regulation thereof being equivalent to the actual value of a difference in speeds of rotation (dnK_IST) of the clutch and during the third driving condition, the clutch is subjected to a controlled pressure value dependent upon various value influences.

14 Claims, 3 Drawing Sheets

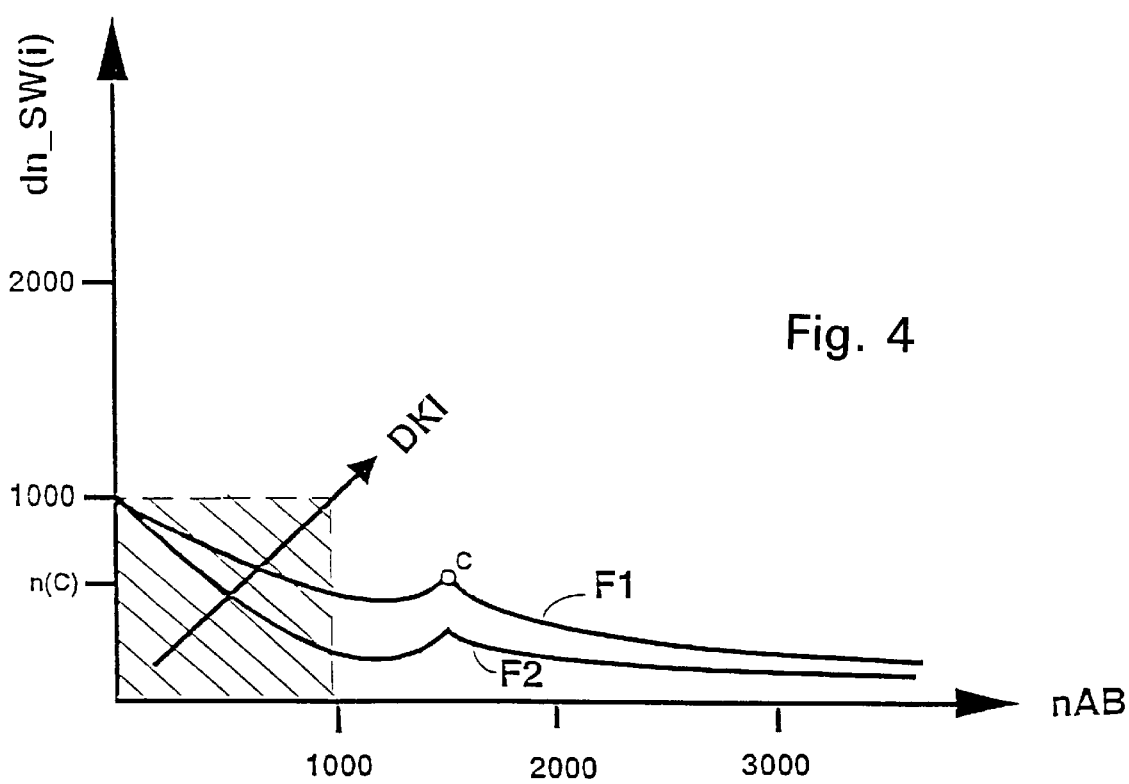

METHOD AND DEVICE FOR CONTROLLING AND ADJUSTING A CLUTCH IN AN AUTOMOTIVE AUTOMATIC STEPPED GEARBOX

FIELD OF THE INVENTION

The invention concerns a method for the control and adjustment of a clutch in an automated stepped transmission for a motor vehicle with an interruption in traction during a shift procedure, wherein, an electronic control system with two control circuits determines the behavior of the said clutch. The invention further includes an apparatus for the execution of the method for the control and adjustment of a clutch in a transmission of a motor vehicle.

BACKGROUND OF THE INVENTION

The term "clutch", within the concept of the invention, encompasses the meaning, "starting clutch". This term includes clutches, which are placed between an internal combustion motor and an automatic transmission, clutches with capabilities to bypass torque converters, as well as clutches and brakes incorporated in automatic transmissions, which can be employed both for start-up and shifting purposes.

Especially, the invention concerns wet start-up clutches, which can be integrated into an automatic transmission. Mostly, such start-up clutches are to be found in combination units at the transmission input side, serving, for instance, as a starting element in an automatic transmission. In particular the said wet clutch is also of value as an assembly unit on the output side of continuously variable transmission (hereinafter CVT).

Normally, clutches and brakes in automatic transmission or in automated stepped transmission are electro-hydraulically activated, operating independent of intervention by the shifting elements. The said clutches and brakes then perform as gear position shifting means, assembly gear change clutches, start-up clutches or converter bypass clutches. To enable this service, usually an electronic transmission control apparatus processes, specifically for the individual vehicle, transmission and driving demands dependent upon the driving condition. These specifics can include axle gear ratios, transmission gear ratios, motor torque, motor rotation speed, throttle pedal position, and/or the like. The acquired data, as input, is transmitted to an electronic control apparatus and, by means of actuators and hydraulic valves, then converted into hydraulic control pressures designated for corresponding clutches. This latter data input would include, clutch related signals, such as, pressure control for pressure regulation or pressures during a gear change, and/or speed of rotation control during slip operation.

A procedure for the control of a start-up clutch, along with other matters, has been made known by DE 44 09 122 A1. The start-up control comprises, in this case, two phases. In a first phase, the input speed of rotation of the clutch is directed to a set-speed of rotation, wherein this set speed of rotation is determined by the driver's demand for power and the current mode of driving activity. In the second phase, the difference between the input side and the output side speeds of rotation of the clutch is reduced to a set value of zero.

DE 39 37 976 discloses a procedure for the control of a clutch, which serves for clutch disengagement due to vibration disturbance. The slippage in the clutch, in this case, changes depending on speed of rotation equalization as determined at the transmission output.

EP 0 214 989 B2, again makes known the use of a clutch integrated in an automatic transmission as a start-up element.

DE 198 40 573, of the applicant, which up to now has not been published, describes a procedure for the control and regulation of a clutch in a stepless, automatic transmission for a motor vehicle, according to which, the control and regulation occurs during two driving conditions, by means of a first control circuit. The degree of this control corresponds to the set value of a difference in speed of rotation of the clutch. The first condition corresponds to a start-up process and the second condition corresponds to driving with a variable ratio arrangement.

From the likewise non-published DE 138 40 572 of the applicant, there is made known a process for the control and regulation of a clutch in an automated stepped transmission with traction interruption, that is to say, in an automated stepped transmission which can shift in accord with the load. With this method, during three conditions of driving (enumerated below), control is effected by means of a first regulating circuit. The degree of regulation, or control, corresponds to the set value of a difference in speeds of rotation of the clutch. The first condition of driving relates to a start-up process. The second condition of driving pertains to driving with a constant gear ratio. The third condition comes into play, when a load shifting, that is to say, a change of the ratio is initiated from a first into a second gear step of the automatic drive.

SUMMARY OF THE INVENTION

Given the above description of the state of the technology, the present invention has the purpose of making available a procedure for the control and regulation of a clutch in an automated stepped transmission for a motor vehicle along with an apparatus for the execution of said procedure for the control and regulation of a clutch, and to further develop the same with consideration given to the manifold usages of a single clutch, especially to achieve to an improved quality of regulation and control-dynamics, in connection with an automated stepped-transmission.

The object of the invention is to be found advantageously therein, in that for the control and regulation of the clutch during the first condition of driving, a first regulation circuit is employed. The degree of regulation corresponds to the actual value of the speed of rotation of the motor $n\_MOT\_IST$ and corresponds to the input speed of rotation of the clutch. During the second condition of driving, a second regulatory circuit is used, the degree of regulation being equivalent to the actual value of the difference in rotational speeds of the clutch $dnK\_IST$. Finally, during the third condition of driving, the clutch, which is subjected to controlled values of pressure which, in turn, are influenced by various factors. The three conditions of driving correspond, in the above to a first condition comprising a start-up procedure when under a threshold vehicle driving speed in traction operation, a second condition marked by driving the vehicle at a speed above the start-up procedure, i.e. above a threshold driving speed with a positive or negative torque in traction or compression mode and as well as driving under a vehicle threshold speed with a negative torque at output, and a third condition, wherein the start-up condition differentiates itself from the other driving conditions, in that the driving speed is less than a threshold value and the vehicle motor can stall under this said threshold value.

By means of the procedure in accord with the invention, advantageously, a better reaction of the transmission regulation is achieved in regard to load shifting, especially upon letting up on fuel feed in the third condition, since in this case, the control still performs an empty action upon the pressure at the clutch although no adjustment takes place.

Further, the difference of speeds of rotation over the clutch is not brought to a value of zero. The advantageous consequence of this is that a vibration disengagement between the motor and the transmission is achieved.

In a development of the invention, the proposal is brought forth, that the level of pressure, pAK of the clutch in the first and in the second condition can be calculated from the sum of an offset value pAK__OFF and a sum value pSUM. The sum value pSUM is determined principally from the balance of the controlled torque MK(ST) of the clutch, the regulated total torque MK(RE)' of the clutch and the disengagement shift torque MLS__ENT.

The controlled torque MK(ST) is predominately determined from the dynamic torque of the clutch MDYN__K and the motor torque MMOT.

The regulated summation torque MK(RE)' of the clutch is principally determined from the dynamic motor torque MDYN__MOT and a regulated torque MK(RE).

The regulated torque MK(RE) in the first condition of driving is to the greater part derived from the set/actual value comparison of one of the motor rotational speed n__MOT equivalent values and a loading demand of the driver DKI by means of a regulator.

The gear position dependent set difference of speeds of rotation dn__SW(i) for a start-up gear of the automated stepped transmission, in the second condition is arrived at by the characteristic engine map KF(i1) This engine map presents an association of the load demand of the driver DKI and the output speed of rotation nAB of the clutch.

During a traction interrupting shifting of the automated stepped transmission, there is carried out a switch shift from a gear position dependent characteristic field KF(i1) to a characteristic field KF(i2).

The regulated torque in the second driving condition MK(RE) is principally determined from the set/actual comparison of the speed of rotation difference dnK__SW, dnK__IST of the clutch and a load demand DKI of a driver in the regulator 6.

Advantageously, the regulator contains a limited integrator, whereby, the regulation deviation from the set/actual comparison of the speeds of rotation difference dnK__SW, dnK__IST of the clutch, the displacement speed of the load demand DKI and the ratio of actual value to the set value of the difference of speeds of rotation. dnK__IST/dnK__SW of the clutch are conducted to the said integrator as input values.

Again advantageously, in the transition from the first or third condition of driving into the second condition of driving the set value of the difference in speeds of rotation dnK__SW is conducted through a filter, especially a dynamic delay member, whereby, the actual value for the difference in speeds of rotation, this being dnK__IST, is input as a start-point for the delay timing.

Also, at this point, the transition is carried out between the gear step dependent characteristic field during the traction interrupted shifting.

The characteristic fields are, in this matter, so formulated, that in the case of a vehicle speed v, less than a threshold GW, an increased difference in speeds of rotation dn__SW(i) appears at the clutch. By this means, an effective stalling protection is achieved for the non-starting gear positions, these being the fourth or fifth gear of the automated stepped transmission.

Advantageously, also in the second condition of driving, at a vehicle speed v less than threshold value GW an increased difference in speeds of rotation dn__SW(i) in the clutch is created and serves as stalling protection. In connection with this, the increased difference in speeds of rotation is adjusted to be greater than the difference of the minimal speed of rotation of the internal combustion engine n__MOT__MIN and the output speed of rotation of the clutch nAB.

In the third driving condition, the level of pressure pAK at the clutch arises from a pressure value, which is dependent upon one or more of the following values: throttle flap position, motor torque, load shifting, or the like and wherein the pressure value has a controlled level.

Advantageously, also an apparatus for the execution of a procedure for the control and regulation of a clutch in an automated stepped transmission is made available. For this purpose, an electronic control apparatus with a first and second regulating circuit is provided, wherein the regulated size of the first regulation circuit is equivalent to the actual-value of the motor speed of rotation and the regulated value of the second regulation circuit is equivalent to the actual-value of a difference in speeds of rotation of the clutch.

BRIEF DESCRIPTION OF THE DRAWINGS

The invention will now be described, by way of example, with reference to the accompanying drawings in which:

FIG. 4 is a characteristic field for non-start-up gear steps.

DETAILED DESCRIPTION OF THE INVENTION

Figure 1:
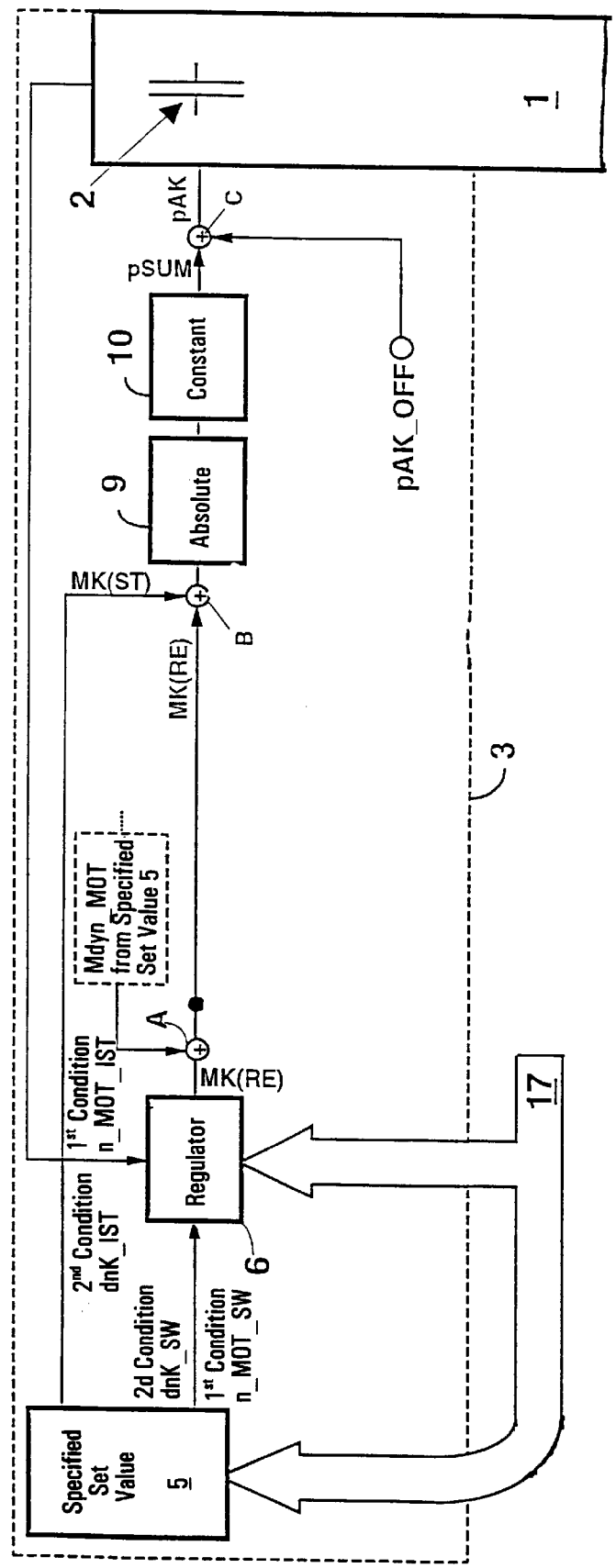
FIG. 1 is an overview of the first regulation circuit.

FIG. 1 shows the first regulatory circuit 3 for the control and adjustment of the clutch 2. As to clutch 2, within the concept of the invention, a "start-up clutch" is to be understood. This clutch can be installed on the input side of the stepped transmission 1, or can serve as the torque converter bypass or a clutch which is integrated in the transmission. Input values 17 are fed to the first and second regulatory circuits, respectively, 3, 4. The input signals 17 are: a signal of load demand from the driver, which is comprised of throttle flap positional data (DKI), the rate of change thereof, the torque of an internal combustion motor (motor not shown) which drives the automated stepped transmission 1, the in/out speeds of rotation of the clutch 2. The regulatory circuit 3 is represented by the blocks in FIG. 1, namely, Block 5 specified set value; Block 6 regulator; Block 9 absolute value, and Block 10 constant value. The specified set value signal 5 delivers its output to the regulator and the controlled torque MK(ST) of the clutch 2 as well as the dynamic motor torque MDYN__MOT. The inner structure of the set value signal 5 is described in more detail below in connection with FIG. 2. The values 17 are input to the regulator 6 as well as the regulation set value and the actual value. In the first condition of driving, the regulator actual-value represents the motor set speed of rotation n__MOT__SW and the actual value n__MOT__IST. In the second condition, the regulator-set value represents the specified difference in speeds of rotation at the clutch 2, this being dnK__SW and the actual value corresponds to the actual difference in speeds of rotation dnK__IST of the clutch 2. The inner structure of the regulator 6 is more fully explained in connection with FIG. 3. The output value of the regulator 6 is the now regulated torque MK(RE) of the clutch 2. From the regulated torque MK(RE) of the of the clutch 2 and the dynamic motor torque MDYN_MOT arises the regulated cumulative torque MK(RE)' at summation point A. This value proceeds to summation point B to be combined with the controlled torque MK(ST) which in turn had evolved from the set value signal emanating from 5. From this cumulative value, by means of the function block 9, the said value is made absolute and the result weighted with a constant, represented by block 10. The output-value is a cumulative pressure pSUM. This cumulative pressure pSUM, is further biased at summation point C by a pressure offset pPAK_OFF. The final, adjusted pressure level pAK is the level of pressure which is available to clutch 2.

Figure 2:
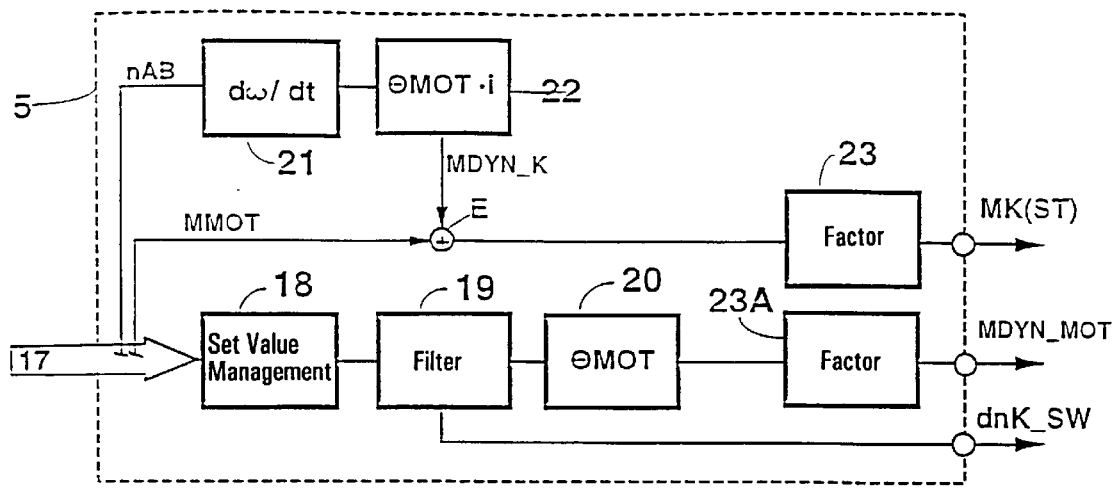
FIG. 2 is a block flow diagram of determined set-point values.

The inner structure of the set-value signal 5 is presented in FIG. 2. The described input signals from 17 are directed to this function. In the function block 18, termed, "Set value management", the input value of the speed of rotation of the internal combustion motor, throttle flap position DKI, and the torque of the said internal combustion motor provides a rough set-value of the difference in speeds of rotation of the clutch 2. This value is conducted to filter 19, which is generally a PT-1 member with a slope limitation, and is filtered at this point. One output value of the filter 19 is the set value dnk_SW which represents the difference in speeds of rotation of the clutch 2. This set value is made available at the output port of the set value signal 5. A second output value of the filter 19 is directed to the function block 20 which represents the input of the motor inertial torque θ-MOT and subsequently modified by a factor 23A. The output is then the dynamic torque of the internal combustion motor MDYN_MOT. From the output speed of rotation nAB of the clutch, by means of the function block 21, the angular speed gradient dω/dt is determined. The result is multiplied in the function block 22 with the motor inertia torque θ-MOT and with the actual ratio of the automated step transmission represented by "i". The product, i.e., the output value is the dynamic torque MDYN_K at the clutch 2. The following equation now holds true:
in the gradient adjustment phase:

$$MDYN\_K = Theta-MOT \cdot i1 \cdot dOmega/dt$$

At the summation point E this dynamic torque of the clutch 2 is combined with the torque MMOT from the internal combustion motor. This result is then added to the previously computed dynamic torque of the internal combustion motor MDYD_MOT at the summation point F. The res ult thereof is weighted with a tuning factor in the function block 23, the output magnitude of which is the controlled torque MK(ST) of the clutch 2.

Figure 3:
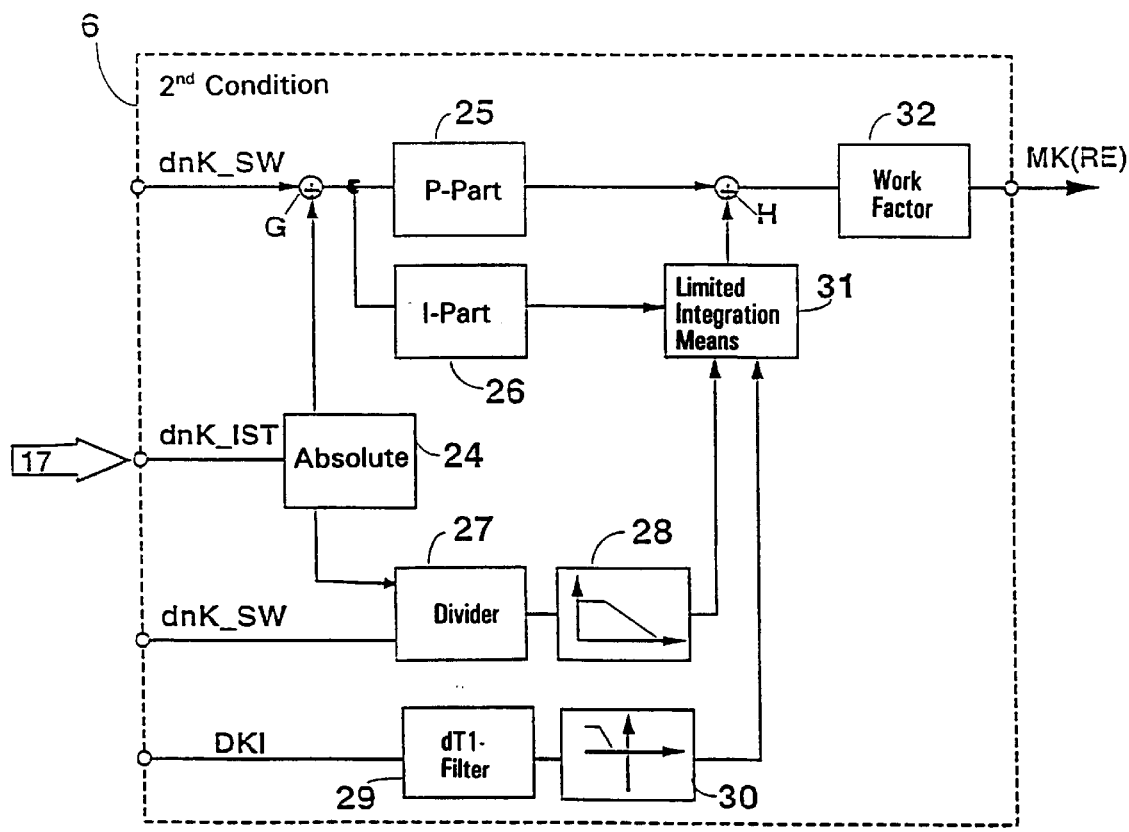
FIG. 3 is a block flow diagram of a regulator.

In FIG. 3 is presented the inner structure of the regulator 6. Input to the regulator 6 comprises the data from 17, as well as the set value dnK_SW, and the actual value dnK_IST both concerning the difference of the speeds of rotation of the clutch 2. The function block 24 forms an absolute value from the actual value dnK_IST. This absolute value is then the input value for the divider 27 and for the summation point G. At the divider 27, delivered as second input is the set value dnK_SW, i.e., the difference of speeds of rotation of the clutch 2. The resulting quotient is conducted to the function block 28, the characteristic line of dynamic depressing. By means of this characteristic line, in the case of very small slippage amounts, for example, less than 10 revolutions, the input value of the integrator 31 is artificially increased. By this means an additional ramplike pressure reduction is achieved.

The point of application arises from the ratio of the actual to the set value of the difference in speed or rotation of the clutch 2.

The input designated "throttle flap data" DKI is the input signal for a dT1-member, this being filter block 29. The output signal of this filter is then the input signal for the characteristic line "Open Quick!", i.e. block 30. By means of this characteristic line, which is dependent upon the load desire of the driver, that is, the driver's selected rate of change in making a rapid gas retraction, the input value to the integrator 31 is artificially increased. By this action, there is achieved an additional ramp shaped pressure reduction. The pressure reduction, can be altered by the said characteristic line.

At the summation point G, the set value dnK_SW is added to the absolute actual value—that being formed in the function block 24—of the difference of speeds of rotation of the clutch 2. The result thereof is run parallel, first to function block 25, this being proportional part, i.e., P-part 25 and second to a I-portion, 26. The output magnitude of the P-part from function block 25 acts upon the summation point H. Parallel, as said, the output value of the function block 26 also acts upon the limited integrator 31. The output from this limited integrator 31 is now input to the summation point H where it merges with the said P-portion from functional block 25. From summation point H the combined signal is received by the action factor 32. By means of the action factor, the decision is made as to in which direction the actual regulating torque is to operate. This is necessary for the determination of the disengaging torque MK_ENT.

FIG. 4 depicts a gear-position-dependent characteristic field. By means of this characteristic field KFi, the difference in the speeds of rotation dn_SW(i), for instance, the fifth gear of the automatic stepped transmission, is determined. The characteristic field contains a defined zone between the two limiting, characteristic lines F1 and F2. The limiting line F2 represents 0% and the limiting line F1 denotes 100% of the throttle flap information DKI. On the limit line F1 a point C has been marked. This increase of the speed of rotation in excess amount, being the value n(c), so acts, that the clutch, is held in a slipping condition, so that an active vibration disengagement is achieved. Within the characteristic field is displayed a cross-hatched area. This area serves for the protection against stalling. That means, upon small output speeds of rotation, nAB the clutch 2 will bias these speeds with a defined set value of the difference in speeds of rotation.

The protection from stalling can be computed from the following equation:

$$dnK\_SW(i) > NMOT\_MIN - nAB,$$

wherein:
  NMOT_MIN: represents the minimal speed of rotation of the internal combustion motor, and
  nAB: represents the output speed of rotation of the clutch 2.

Reference Numbers, Symbols and Items 1 automated stepped transmission
2 clutch
3 first regulation circuit
4 second regulation circuit (?)
5 function box, output, specified set value
6 function box, regulator
9 function box, changes value to absolute number
10 function box, inserts predetermined constant bias 17 arrow, indicates basic input, load, throttle, motor torque
18 function box, set value management
19 function box, electronic filter
20 function box, motor inertia (θMOT)
21 function box, angle speed slope (dw/dt)
22 function box, product computation: (θMOT.i)
23, 23A function boxes, factors
24 function box, converts input to absolute number
25 function box, proportional part (P-part)
26 function box, I-part
27 function box, divider
28 function box, characteristic line, pressure reduction
29 function box, dT1-member, (filter)
30 function box, characteristic line, "Open quick"
31 function box, limited integrator
32 function box, action factor (determines torque direction)

| | |
|---|---|
| n_EIN | input speed of rotation of clutch |
| nAB | output speed of rotation of clutch |
| n_MOT_IST | actual speed of rotation of motor |
| n_MOT_SW | set value of speed of rotation of motor, gear related |
| n_MOT_MIN | minimal value of speed of rotation of motor |
| dn_SW(i) | gear position dependent speed of rotation of clutch |
| dnK_SW | set value of difference of speeds of rotation of clutch |
| dnK_IST | controlled torque at clutch |
| MK(ST) | controlled torque at clutch |
| MK(RE) | regulated cumulative torque |
| MK_ENT | disengaging torque of clutch |
| pAK_OFF | pressure offset of start-up clutch |
| pSUM | cumulative pressure |
| pAK | level of pressure at the clutch |
| MDYN_K | dynamic torque at clutch |
| MMOT | torque delivered by motor |
| MDYN_MOT | dynamic torque at motor |
| DKI | throttle flap data = load position |
| dnLS_SW | set value of offset |
| i1 | first stage of gear ratio |
| i2 | second stage of gear ratio |
| KF(i) | characteristic field |
| v | speed of vehicle |
| GW | threshold value of speed of vehicle |
| CVT | Continuously Variable Transmission |

What is claimed is:

1. A procedure for the control and regulation of a clutch in an automated stepped transmission for a motor vehicle, wherein an electronic control apparatus, by means of a first or second regulation circuit determines the behavior of the clutch, whereby two conditions of driving are provided for, and the first condition represents a start-up process for a vehicle in traction operation driven at a speed less than a given threshold speed value, the second condition represents a driving above a threshold vehicle speed and that a traction force interrupted shifting from a first (i1) into a second gear ratio stage (i2) can be carried out, whereby for the control and regulation of the clutch during the first driving condition, the first regulation circuit is employed, the regulation size of which is equivalent to the actual value of the motor speed of revolution (n_MOT_IST) and that during the second condition of driving a second regulation circuit is employed, the regulation size of which is equivalent to the actual value of a difference in speeds of rotation (dnK_IST) of the clutch, therein characterized, in that during a third condition of driving, which corresponds to driving under a threshold vehicle speed in a compression stage, the clutch is subjected to a controlled pressure value dependent upon various influences, and that the actual value of the difference in speeds of rotation (dnK_IST) of the clutch is not set back to a value of zero.

2. The procedure according to claim 1, wherein the level of pressure (pAK) of the clutch, in the first and second condition, determined by an off-set value (pAK_OFF) and a cumulative value (pSUM) yields a total expressed as (pAK=pAK_OFF+pSUM), wherein the total (pSUM) is principally derived from the balance of the controlled torque (MK(ST)) of the clutch, the regulated cumulative torque (MK(RE)') of the clutch and the disengaging load shifting torque (MLS_ENT), which can be expressed as (pSUM=f(MK(SK), MK(RE)', MLS_ENT).

3. The procedure according to claim 2, wherein the controlled torque (MK(ST)) is principally determined from the dynamic torque of the clutch (MDYN_K) and the motor torque (MMOT).

4. The procedure according to claim 2, wherein the regulated cumulative torque (MK(RE)') of the clutch is derived from the dynamic motor torque (MDYN_MOT) and a regulated torque (MK(RE)) of the clutch.

5. The procedure according to claim 4, wherein the regulated torque (MK(RE)) in the first driving condition is principally derived from the set/actual comparison of one of the equivalent motor speeds of revolution values and a signal of the load (DKI) from a driver changing said load.

6. The procedure according to claim 4, wherein the regulated torque in the second condition of driving (MK(RE)) is principally determined from the set/actual comparison of the difference of speeds of rotation (dnK_SW, dnK_IST) of the clutch and a load signal (DKI) by a driver changing said load.

7. The procedure according to claim 6, wherein the regulator contains a limited integrator, whereby, as input to the said integrator are sent the regulation deviation from the set/actual-comparison of the difference of the speeds of rotation (dnK_SW, dnK_IST) of the clutch, the change in rate of the speed of the load signal (DKI) and the ratio of actual/set, of the difference speeds of rotation (dnK_IST/dnK_SW) of the clutch.

8. The procedure according to claim 1, wherein a gear stage dependent set speed of rotation (n_MOT_SW(i)) for one gear stage of the automated stepped transmission is determined by means of a characteristic field (KF(i)), whereby this produces an assignment of a signal of the load (DKI) by a driver and a output speed of rotation (nAB) of the clutch.

9. The procedure according to claim 8, wherein the transition from the characteristic field (KF(i1)) to a characteristic field (KF(i2)) is carried out during the interrupted traction shifting.

10. The procedure according to claim 1, wherein in the case of a transition from the first or third driving condition into the second driving condition, the set value of the difference in speeds of rotation (dnK_SW) is conducted through a delay member, wherein, as the start value of said delay member, the actual value of the difference in speeds of rotation (dnK_IST) is input.

11. The procedure according to claim 1, wherein in the case of a vehicle speed (v) less than a threshold value (GW), an increased difference of the speeds of rotation (dn_SW(i)) of the clutch is employed as a stalling protection by means of a corresponding second characteristic field (KF(i)).

12. The procedure according to claim 1, wherein in the second condition of driving, at a vehicle speed (v) less than a threshold value (GW) an increased difference in speeds of rotation (dn_SW(i)) of the clutch is considered to be a protection against stalling, whereby the said difference in speeds of rotation (dn_SW(i)) of the clutch is input as the difference from the extreme minimal speed of rotation of the motor (n_MOT_MIN) and the value of an output speed of rotation of the clutch (nAB).

13. The procedure according to claim 1, wherein the pressure level (pAK) of the clutch, in the third condition of driving arises from one of one or more of the following values which are dependent upon pressure value: throttle flap, brake actuation, brake pressure, motor torque, and load shifting.

14. An apparatus for the execution of a procedure according to claim 1 for the control and regulation of a clutch in an automated stepping transmission for a motor vehicle, having an electronic control device with a first and a second regulatory circuit, whereby the regulatory amount of the first regulatory circuit is equivalent to the actual value of the motor speed of rotation (n_MOT_IST) and the regulatory amount of the second regulatory circuit is equivalent to the actual value of a difference of rotational speeds (dnK_IST) of the clutch, and the actual value of the difference of rotational speeds (dnK_IST) of the clutch is not set back to a value of zero.

* * * * *

UNITED STATES PATENT AND TRADEMARK OFFICE
CERTIFICATE OF CORRECTION

PATENT NO.     : 6,625,536 B1
DATED          : September 23, 2003
INVENTOR(S)    : Martin Vohmann et al.

It is certified that error appears in the above-identified patent and that said Letters Patent is hereby corrected as shown below:

Column 2,
Line 14, change "DE 138 40 572" to -- DE 198 40 572 --.

Signed and Sealed this

Twenty-third Day of December, 2003

JAMES E. ROGAN
*Director of the United States Patent and Trademark Office*